INVENTOR.
RICHARD G. COUNIHAN
BY William V. Schelberg
AGENT

Sept. 1, 1959 R. G. COUNIHAN 2,902,677

MAGNETIC CORE CURRENT DRIVER

Filed July 2, 1954 4 Sheets-Sheet 2

INVENTOR.
RICHARD G. COUNIHAN

BY William V. Schelberg

AGENT

INVENTOR.
RICHARD G. COUNIHAN
BY William V. Schelberg
AGENT

Sept. 1, 1959 R. G. COUNIHAN 2,902,677

MAGNETIC CORE CURRENT DRIVER

Filed July 2, 1954 4 Sheets-Sheet 4

INVENTOR.
RICHARD G. COUNIHAN

BY William V. Schelberg

AGENT

United States Patent Office 2,902,677
Patented Sept. 1, 1959

2,902,677

MAGNETIC CORE CURRENT DRIVER

Richard G. Counihan, Poughkeepsie, N.Y., assignor to International Business Machines Corporation, New York, N.Y., a corporation of New York Application July 2, 1954, Serial No. 440,983

4 Claims. (Cl. 340—174)

The present invention relates to magnetic core memory systems and is directed in particular to a circuit arrangement providing driving currents therefor.

In arrays of magnetic cores employed for storage of binary information as represented by relative stable remanence states attained by individual cores, it is convenient to consider them arranged in ordered geometric form for operation in accordance with the well known coincident current technique. With such systems a coincidence of two input signals is generally required to provide a magnetomotive force of sufficient magnitude to overcome the coercive force of any one core and for this purpose the memory array is arranged in rows and columns each of which is formed by cores linked by an individual winding. By applying a pulse to one column winding and a coincident pulse to one row winding, each pulse providing a force less than the coercive force, only that core linked by both windings changes remanence states to register the information represented by the pair of pulses. Such an operation as described may be employed in storing the desired bit of information at a particular row and column address. In interrogating this core to determine the state at which it exists, the two linking windings are again pulsed in coincidence but in an opposite sense. The interrogating or read pulsing returns the core to an initial remanence state and causes a voltage to be induced in a sense winding linking the core, due to collapse of the magnetic field in one direction and its build up in the opposite direction. This interrogation provides an output pulse indicative of the particular residual state attained by the core, but at the same time, the information is destroyed. If the information is to be repeatedly read out it must be restored after each reading and for this purpose every read pulse cycle is commonly followed by a write cycle to restore the core to the state held before reading. When the memory organ is to be cleared of information, the write cycle is disabled so that the cores are reset to a datum state.

The pulse generators for driving an array of any appreciable size must be capable of delivering power in proportion to the number of cores linking the row or column windings and must also be capable of bidirectional operation unless a pair of oppositely wound sets of row and column windings are provided for the cores.

Accordingly, one object of the present invention is to provide a magnetic core memory array driving system capable of delivery of appreciable impulse power.

A more specific object is to provide a magnetic core current driver capable of producing a bidirectional output by transformer action.

Another object of the invention is to provide a magnetic core current driver capable of bidirectional operation and which is controlled by an electron discharge device.

A further object of the invention is to provide a magnetic core current driver system operable under control of low energy signals and developing a selective bidirectional output of sufficient power to control a large magnetic core memory array.

Other objects of the invention will be pointed out in the following description and claims and illustrated in the accompanying drawings, which disclose, by way of example, the principle of the invention and the best mode, which has been contemplated, of applying that principle.

The storage of binary information through establishing representative states of magnetization in bistable magnetic devices is well known. Magnetic cores having a somewhat rectangular hysteresis characteristic, such as that shown in Figure 1, are employed for memory applications and are driven to one or the other of their stable residual states by energizing windings which embrace the cores and apply a magnetomotive force thereto of desired magnitude and direction.

One of the stable remanence states is arbitrarily chosen to represent a binary one, for example, point *a*, and the other state, point *b*, then represents a binary zero. When a change from one residual state to the other takes place, an output voltage is induced in a winding linking the core and this induced voltage is used for indicating that a change from one state to the other has occurred.

Figures 1, 2:
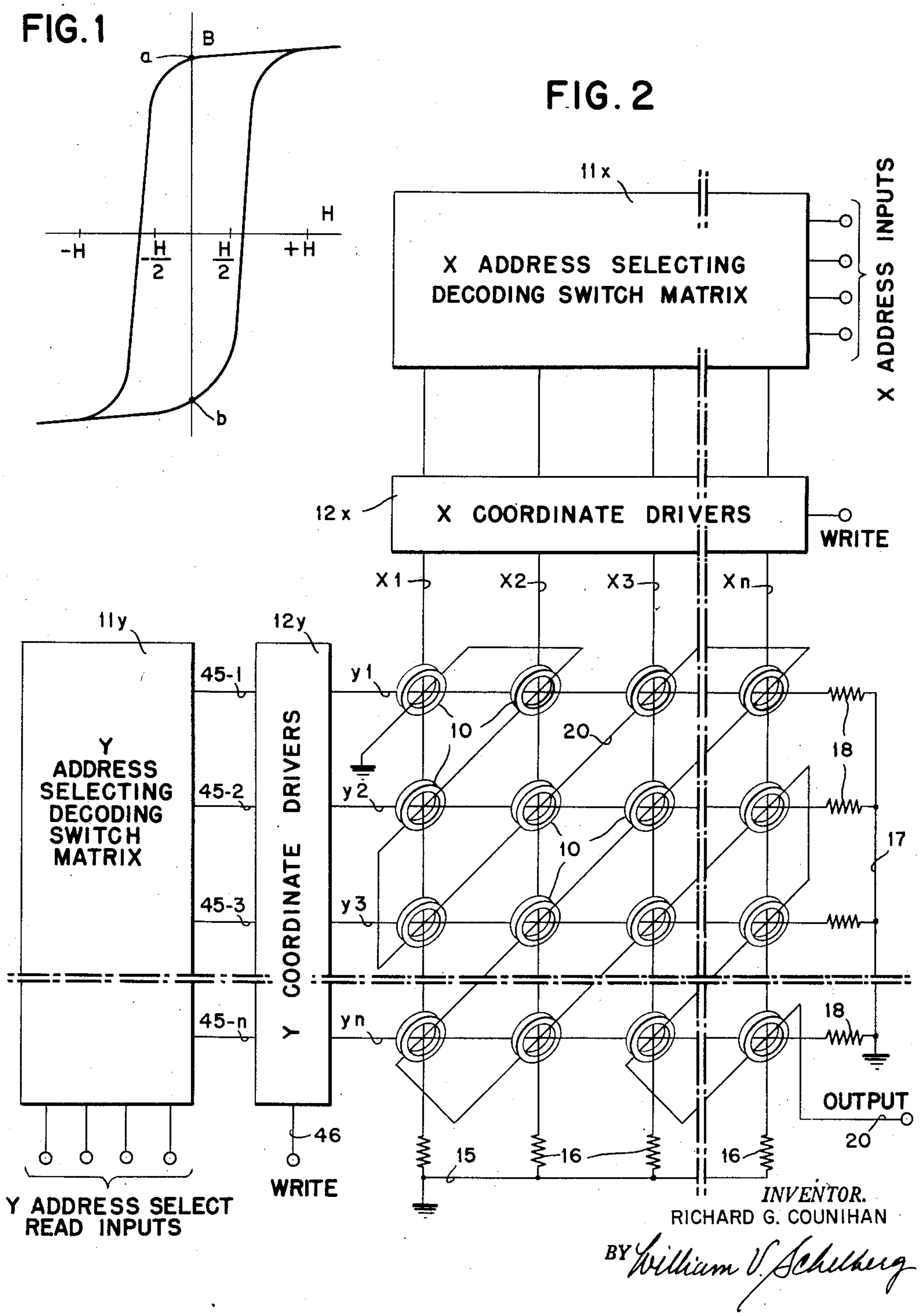
Figure 1 is a curve representing the magnetic characteristics of materials used for memory elements.
Figure 2 is a diagrammatic representation of a two dimensional array of magnetic cores connected in a system illustrating the present invention.

A two dimensional magnetic core memory array is shown in Figure 2 with saturable cores 10 shown as toroids and positioned in rows and columns. Each column of cores 10 is linked by a winding X having one turn and each row of cores is linked by a winding Y also shown as having a single turn. The form of the cores may vary as well as the number of turns of the X and Y windings since the present invention contemplates the use of these cores and windings in any conventional form.

A coincidence of two input signals is generally required to provide a magnetomotive force sufficient to overcome the coercive force of any one core and for this purpose the X and Y coordinate windings are energized selectively through a decoding matrix 11 and a pulse driver system 12. The decoding matrices or address selecting systems 11 may be in the form of a crystal diode matrix, for example, and with separate X and Y windings on each core 10 for the read and write operations as shown in the copending application, Serial No. 376,300, filed August 25, 1953, now Patent No. 2,739,300. Other suitable circuits illustrating address selecting matrices are disclosed in an article entitled "Rectifier Networks for Multiposition Switching" published in the Proceedings of the I.R.E. of February 1949, pages 139–147. Use of a diode matrix or similar device reduces the number of input switches required, as by controlling *n* inputs thereto, any one of $2^n$ output lines may be selectively energized. It is impractical for a conventional diode matrix to drive a large memory array directly, however, due to the rapid recovery time and high power required and, in accordance with the present invention, coordinate pulse drivers 12X and 12Y are provided to supply sufficient input power as will be described later in detail. The remaining terminal of each of the matrix column windings X is connected to a grounded bus 15 through individual resistors 16, and the remaining terminal of each of the row windings Y is connected to a grounded bus 17 through individual resistors 18. A sense winding 20 is shown linking each of the cores 10 and is wound in zig-zag fashion through the array in accordance with conventional practice to cancel out some of the effects of the cores that are partially excited on read out pulsing.

To describe the operation of this array, consider for example a core 10 having attained the magnetic state represented at point *b* on the curve of Figure 1. Application of a magnetomotive force of $$+\frac{H}{2}$$

magnitude, less than the coercive force, is ineffective to alone flip the core to state *a*, however, by applying a pulse providing $$+\frac{H}{2}$$

force to one of the vertical windings X and a coincident pulse of like magnitude to one of the row windings Y through the drivers 12 and selection matrices 11, a total magnetomotive force of +H is developed in the core with which the selected X and Y windings intersect. Only this core will then change states as the remaining cores linked by these X and Y lines have been subjected to only $$\frac{H}{2}$$

magnetomotive force.

To read a selected core, a pulse of $$\frac{H}{2}$$

magnitude is generally applied to the X and Y winding in coincidence through the drivers 12X and 12Y respectively, but in a sense opposite to that used for writing. This develops a total M.M.F. of —H at the core located at the intersection of the pulsed windings and, if it stands at point *a*, a relatively large change in flux takes place to develop an output signal on the winding 20. On the other hand, if the core stands at point *b*, only a small flux change occurs due to the departure of the cores from an ideal rectangular characteristic.

To apply both read and write impulses to the same winding of the array, the drivers 12X and 12Y must be bidirectional and, since interrogation destroys the stored information, each read cycle is normally followed by a write cycle to restore the core to the state attained prior to reading.

Figure 3:
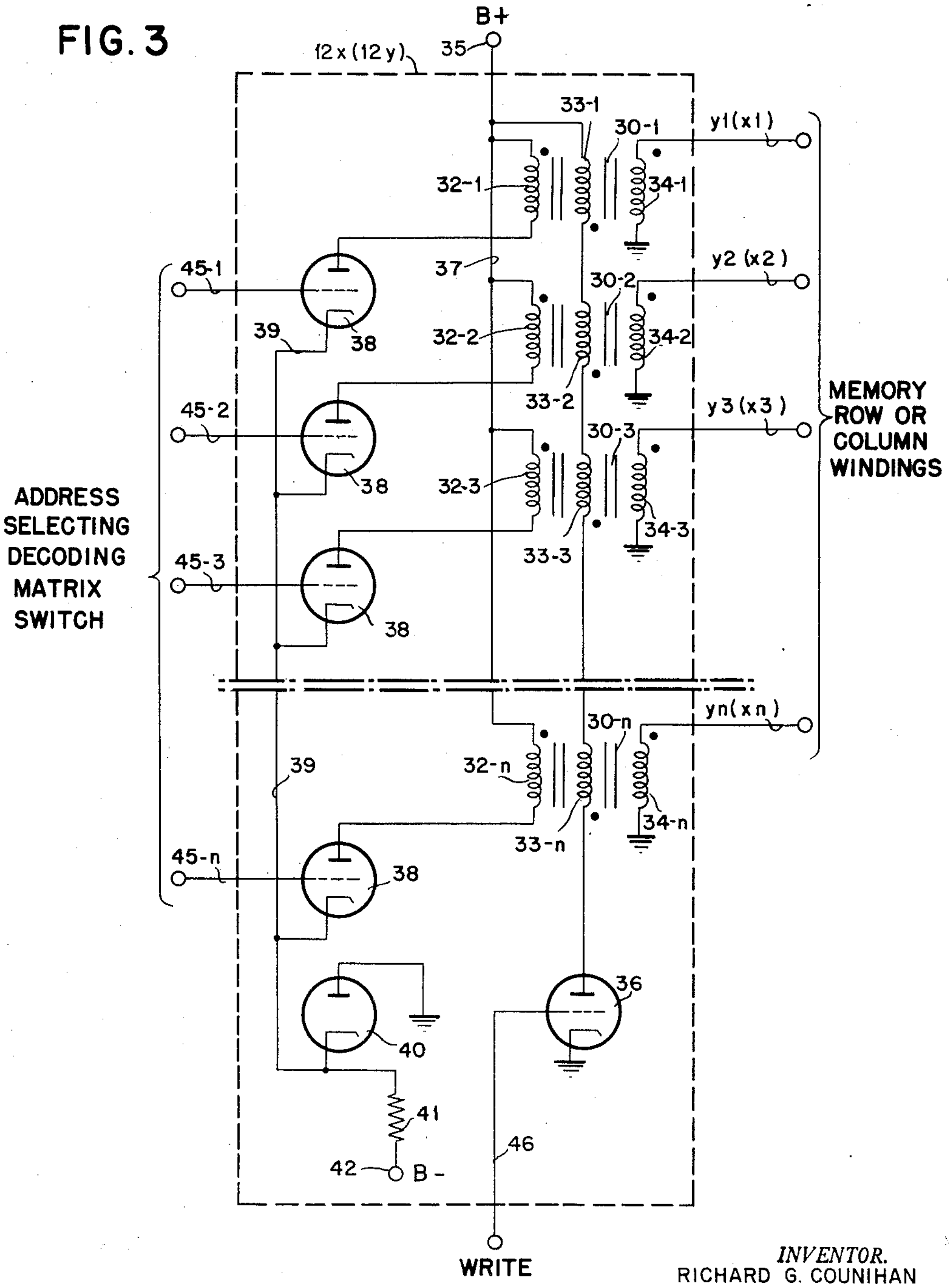
Figure 3 is a circuit diagram of the bidirectional magnetic core drivers shown in block form in Figure 2.

The coordinate drivers 12X and 12Y shown in Figure 2 are similar and, in accordance with the present invention, are bidirectional. Referring now to Figure 3, the magnetic core driver is shown in detail with the principal element being a magnetic core 30. One core 30 is provided for each coordinate line or winding of the array and has input, output and drive windings designated 32, 33 and 34, respectively, with the winding 34 connected at one end to the respective coordinate winding and with the opposite terminal grounded. The drive winding 33 of each core is series connected between a terminal 35, held at a positive voltage by a source indicated as B+ and the anode of a discharge device 36 which has its cathode grounded. The input winding 32 is connected at one end to a lead 37 maintained at B+ potential by connection to terminal 35, and the remaining terminal is connected to the anode of a discharge device designated as element 38. The cathode of each device 38 is connected to a common bus 39 which is held at B— potential. In order to allow the tubes 38 to cut off without lowering the grid to B— cathode potential, the bus 39 is coupled to ground through a diode 40 and through a resistor 41 to a terminal 42 upon which B— potential is maintained. Control signals are directed to the tubes 38 through the address selecting switch 11 by leads 45 which are connected to the grids of these devices. Further control signals are directed to the tube 36 by a connection 46 to the grid of this tube.

The cores 30 are made of material having a hysteresis characteristic similar to that shown by the curve of Figure 1 and, in describing the operation, are considered to be normally in a state represented by point *b*. The driving tubes 38 are normally nonconductive with the lead 39 and their cathodes held substantially at ground potential by the voltage developed by current flow from ground through the diode 40 and resistor 41 to the terminal 42.

On receipt of a positive signal pulse from the decoder matrix 11, one of the lines 45 connected to the grids of the tube 38 is raised in potential allowing the associated tube 38 to conduct. Current flow through diode 40 is now cut off since the cathode of the conducting tube 38 reaches a potential positive with respect to ground. Conduction in a tube 38 energizes the associated winding 32 connected in its plate circuit and a voltage is induced in the corresponding winding 34 which passes current through the row or column winding of the memory array cores in a read direction when the core 30 switches from state *b* to state *a*. A dot is placed near one end of each of the windings on cores 30 and indicates that that end is negative on read pulsing and positive on write or drive pulsing.

As mentioned heretofore, a write operation follows a read operation and for this purpose the driver tube 36 is provided and is controlled by signals applied to the lead 46 as received from the apparatus with which the memory array is employed. The core 10 which has been read may have contained a stored binary one or a binary zero and in either case is returned to zero point *b* by the read out portion of the cycle. Restoration of the stored information, therefore, comprises selectively applying coincident input or write signals to the linking X and Y windings of that core in accordance to the signal obtained on the sense winding and as determined by the apparatus with which the memory unit is employed. In recording new information the output of the sense winding is disabled and a positive pulse directed to lead 46 to write a binary one and with no signal applied to write a zero. If a one is to be restored or written into the selected core, a positive pulse applied to lead 46 fires the normally nonconductive tube 36 pulsing the series connected windings 33 of each core 30 but with only the core 30 standing at point *a* on its hysteresis curve change its remanence state so that its output winding 34 is energized. The matrix core 10 which was read is now set to its binary one state, point *a*, by the current from winding 34 in the write direction. Winding 34 provides current to the memory cores on windings X or Y by transformer action and the number of turns is made less than that for the windings 32 and 33 to provide a current step up.

Figure 4:
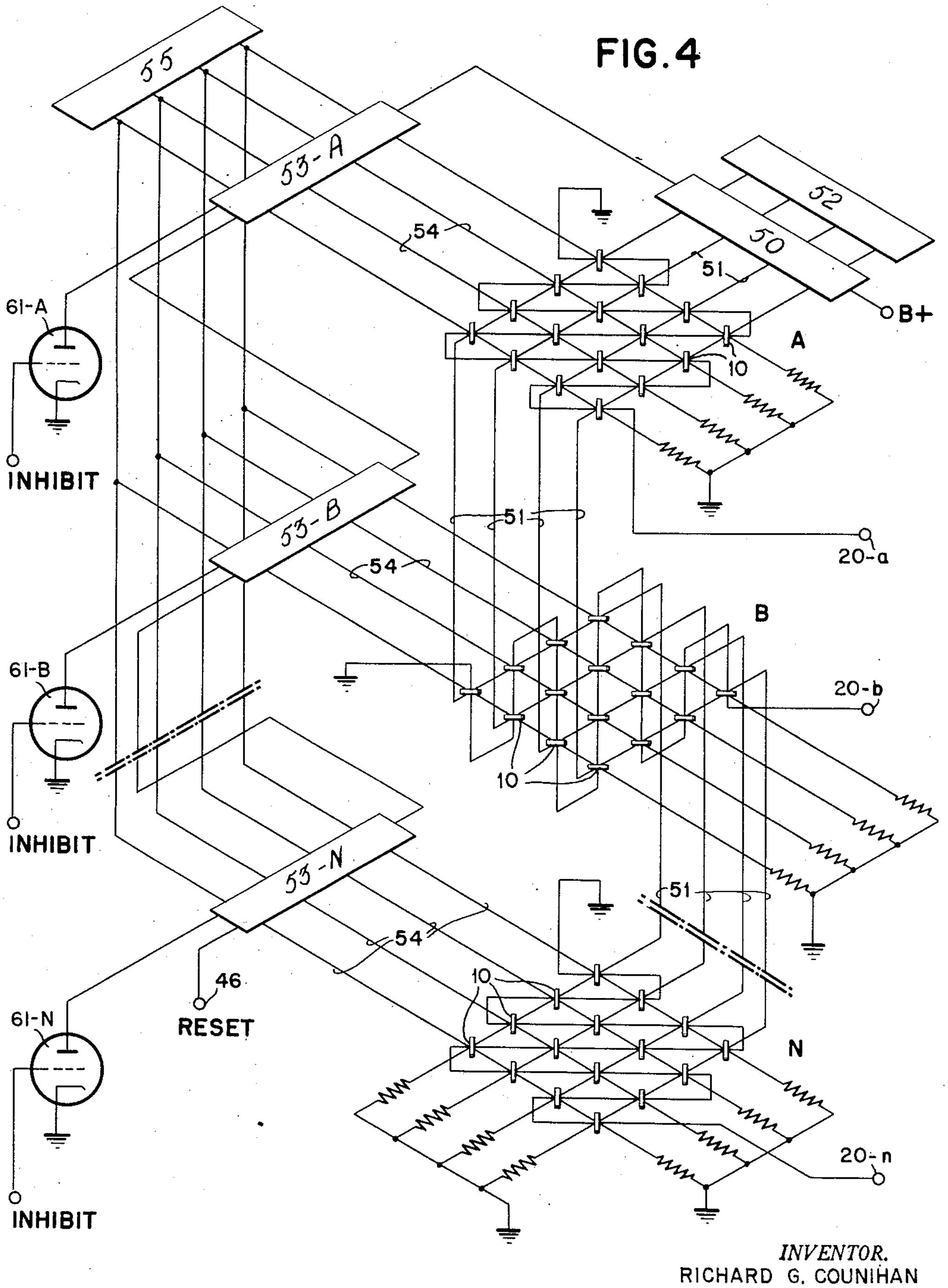
Figure 4 is a schematic representation of a three dimensional magnetic core memory array employing the novel magnetic core driver in modified form.

It must be kept in mind that a similar driver is operated in coincidence to control both the X and Y windings simultaneously and, considering the situation where a zero is read from memory core 10, no change in state from point *b* takes place in this core when the driver core 30 changes from *b* to *a*. To retain this zero state the lead 46 for the X and Y coordinate drivers 12 is pulsed non-coincidentally and the core 10 remains at point *b* as only a force of $$+\frac{H}{2}$$

is provided in the output winding 34 of one driver and is ineffective to write a "one" at this address when applied separately. A two dimensional array as described above has utility in many applications and has been utilized in the description because of its simplicity, however, where a large capacity memory is required, the cores may be arranged in a cubical or three dimensional form for compactness. Such an array may be considered as a stacked group of two dimensional matrices each comprising a Z plane. Such a three dimensional arrangement is illustrated in Figure 4 showing the connections for the drivers 12 as provided in accordance with the invention.

In writing a binary word it is conventional practice to select a two dimensional address in each Z plane to form a word line with the core in each plane representing one bit of the word. The core in each plane is selected by coincident X and Y currents and changes remanence state to store a binary one unless a third winding linking cores in individual Z planes is pulsed with an opposing half-select current to inhibit a change in state in that core. In other words, with each core set at zero, each selected core would register and store a binary one unless inhibited by a Z plane pulse.

Figure 5:
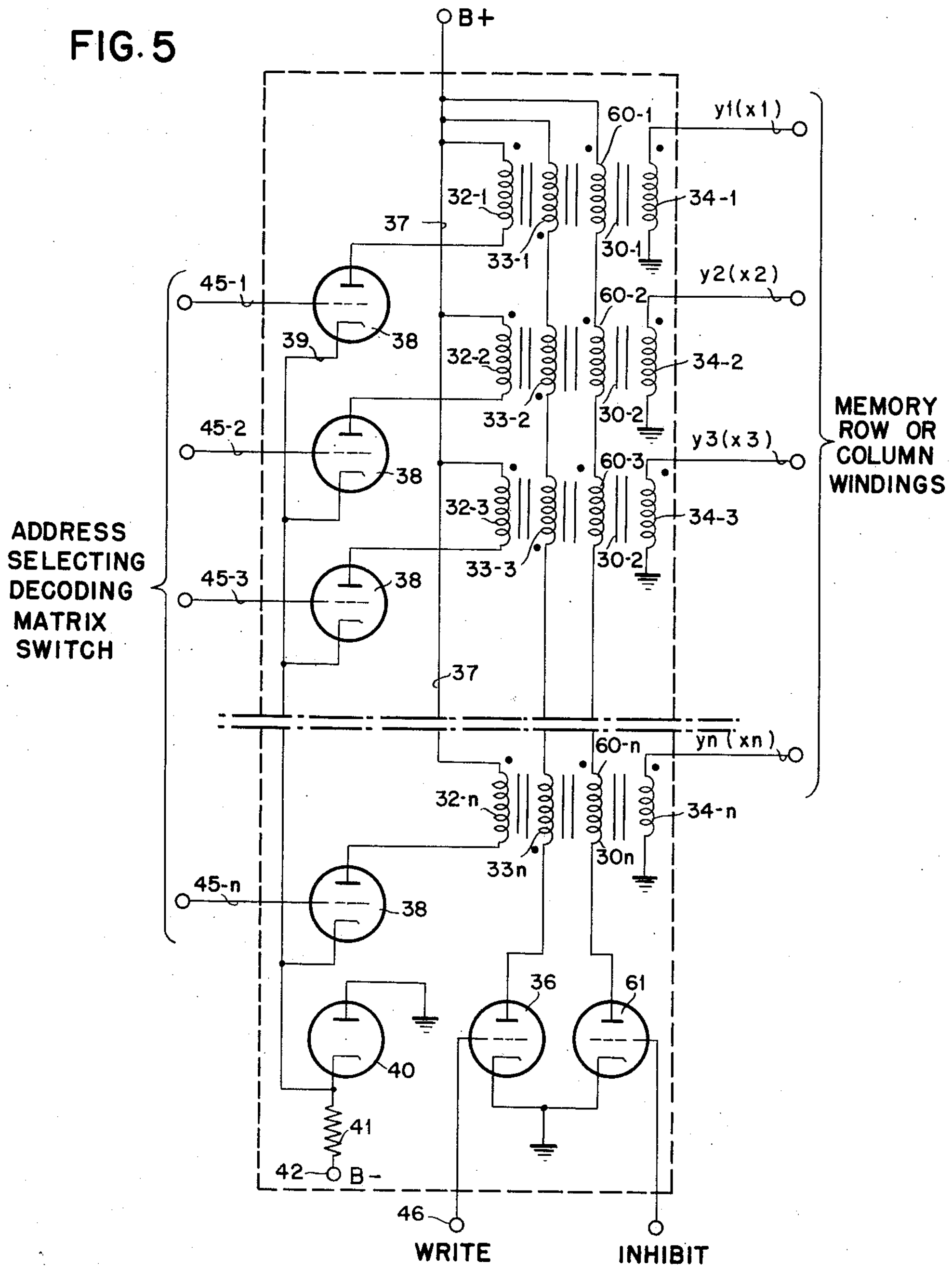
Figure 5 is a circuit diagram of the magnetic core driver as modified for use in the system shown in Figure 4.

By use of the core driver circuit of this invention the inhibiting of selected planes or bits to register zeros is accomplished without the necessity of providing a second winding linking the memory cores of each plane in addition to the sense winding. Referring now to the circuit shown in Figure 4, a coordinate driver 50 is provided having selectively energized lines 51 threaded through the cores of each of a plurality of Z plane arrays A, B, . . . N. The particular line 51 selected for energization is determined by a conventional crystal matrix 52 as in previously described embodiments. Each array is also provided with a similar core driver 53 having selectively energized output lines 54 linking the rows of cores in the associated Z plane array. A single crystal matrix 55, also comparable to the aforementioned address selecting switch 11 shown in Figure 2, is provided for the Z plane drivers 53. Energization of a selected output lead 51 in a manner shown and described in connection with the driver circuit of Figure 3, provides a current pulse to a column of cores in each of the arrays A, B, . . . N and is of a magnitude to provide $$\pm\frac{H}{2}$$

magnetomotive force to each of these cores. Selection of an output line 54 from the core drivers 53 energizes a similar row winding of each of the arrays and provides $$\pm\frac{H}{2}$$

magnetomotive force, so that those cores linked by the pulsed line 51 and one of the pulsed lines 54 is energized sufficiently to change remanence states. To selectively cause such a change in state in writing a binary word or rewriting the word previously read, an inhibiting winding is incorporated in each of the drivers 53 and is pulsed to prevent that driver core 30 from changing states and developing an output in coincidence with the pulse developed on lead 51. Modification of the core driver circuit to provide such an inhibiting winding is shown in Figure 5 with a separate set of series connected windings 60 poled in opposition to the windings 33 and activated through a further discharge device 61. As shown in Figure 4, each of the several arrays is provided with a separate output winding 20 upon which an output pulse is developed on interrogation and representing the binary value stored in the word line. With this arrangement a selected core 30 of the driver unit 50 and a selected core 30 of each of the driver units 53 is set to a state *a* on the hysteresis curve (Fig. 1) in providing a coincident interrogating pulse to the memory cores 10 forming the word line and each would be driven to the opposite state when reset. In accordance with one arrangement, a single reset tube 36 may be provided to drive the windings 33 of each of the core drivers 53A to 53N as well as the driver 50. Such an arrangement assures simultaneous pulsing of the leads 51 and 54 to provide coincident write current to the cores of the word line. To rewrite the information as sensed on the output windings 20, the inhibiting tubes 61 are selectively pulsed to prevent those cores 10 representing a binary zero from receiving a write pulse from the associated core 30 and Z plane driver 53. With the inhibit pulse made of sufficient duration to oppose the reset pulse until the cores 30 are switched, then only the cores 10 in which binary ones are to be written will be subjected to a coincidence of write pulses, and the inhibited cores 30 then reset subsequently without effecting the final state of the memory cores 10 representing zero.

In the arrangements so far described reading and writing functions have been accomplished through use of coincidentally applied current pulses, however the core driver need not be limited to such a specific type of operation. For example, writing may be accomplished by coincident currents and reading by unique pulsing or pulsing with a single current of sufficient magnitude to cause the memory cores to change remanence states. Such an arrangement, carried out by other means, is shown, for example, in application No. 443,234 filed July 14, 1954. To supply a coincidence current pulse and a unique current pulse the same core driver circuit may be employed by setting the core 30 slowly and resetting rapidly or by employing setting or resetting current pulses of different magnitude. An arrangement of this nature is of particular utility where a memory core array is employed as a buffer or temporary storage medium between devices of unlike operating rates.

It is further contemplated that other electronic switching means may be employed in lieu of the discharge tubes 36 and 38, as for example transistors, and it is to be understood that the term discharge device is intended to include such equivalent components.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for selectively activating a plurality of load components comprising a like number of magnetic cores each capable of assuming alternate remanence states; input, output and reset windings for each said core, said input and reset windings being oppositely poled; a discharge device having its anode series connected with each said input winding and to a source of positive potential; the cathode of said discharge devices being connected to a common bus; circuit means coupling said bus to a source of negative potential and through a diode to ground; means for selectively energizing the grid of one of said discharge devices to activate the associated input winding and to thereby set the core inductively coupled therewith to a first remanence state producing a pulse of one polarity in that output winding; means for thereafter simultaneously energizing the reset winding of each said core including circuit means series connecting each said reset winding with a further discharge device to thereby develop a pulse of opposite polarity in the output winding of that core on return to the other remanence state.

2. A magnetic core current driver for one dimension of a coordinate memory array, comprising a plurality of saturable magnetic cores each capable of assuming alternate stable states of magnetic remanence, input, output and reset windings inductively associated with each said core, means including an electron discharge device connected to said input windings and selectively operable to cause certain of said cores to saturate in a first sense; means including a further electron discharge device connected in series with the reset winding of each said core and operable to cause said cores to saturate in a second sense; said output windings developing a pulse of one polarity as the associated core changes saturation from one sense to the second sense and a pulse of opposite polarity as the associated core changes saturation from the second sense to the first sense; and selectively operable means for preventing cores saturated in said first sense from changing saturation states during an initial period of operation of said further electron discharge device comprising a further winding on each of said cores.

3. Apparatus for selectively applying current pulses to a plurality of load components comprising a like number of magnetic cores each capable of assuming alternate stable states of magnetic remanence; input, output, reset and blocking windings inductively associated with each said core; a discharge device having its anode series connected with each said input winding and to a source of positive potential; the cathode of each said discharge device being connected to a common bus; circuit means coupling said bus to a source of negative potential and through a diode to ground; means for selectively energizing the grid of predetermined ones of said discharge devices to activate the associated input winding and thereby set the core inductively coupled therewith to a first remanence state and producing a pulse of one polarity in the output winding of the core; means for simultaneously activating the reset windings of each said core including circuit means series connecting each said reset winding with a further discharge device to thereby develop a pulse of opposite polarity in the output winding of the cores returned to the other remanence state from said first remanence state; and means for selectively energizing said blocking windings of certain ones of said cores simultaneously with activation of said reset windings to render said associated reset windings ineffective to change the remanence state of said certain ones of said cores.

4. In a magnetic core binary memory system, a magnetic core current driver for each coordinate group of selection windings of a coincident current array, each said current driver comprising a plurality of saturable magnetic cores with individual input, output and blocking windings and a common reset winding inductively associated therewith, each of said cores being capable of assuming alternate stable states of magnetic remanence, said output windings being connected to the selection windings of the corresponding coordinate group of said array, means for selectively energizing the input winding of a core in at least two of said current drivers in coincidence, means for subsequently energizing said reset windings in coincidence and means for selectively energizing the blocking windings of certain of said cores in at least one of said current drivers.

References Cited in the file of this patent

UNITED STATES PATENTS

| | | |
|---|---|---|
| 2,691,154 | Rajchman | Oct. 5, 1954 |
| 2,708,722 | An Wang | May 17, 1955 |
| 2,734,182 | Rajchman | Feb. 7, 1956 |
| 2,734,184 | Rajchman | Feb. 7, 1956 |
| 2,776,419 | Rajchman | Jan. 1, 1957 |

OTHER REFERENCES

Publications:

Proc. Assoc. Comp. Mach., May 1952, pp. 213–222.

Electronics Magazine, April 1953, pp. 146–149.

Journal App. Physics, January 1951, pp. 44–48.